US008869521B2

(12) United States Patent  (10) Patent No.: US 8,869,521 B2
Stephenson et al.  (45) Date of Patent: Oct. 28, 2014

(54) FLUID WORKING MACHINE WITH CYLINDERS COUPLED TO SPLIT EXTERIOR PORTS BY ELECTROHYDRAULIC VALVES

(75) Inventors: Dwight B. Stephenson, Oconomowoc, WI (US); Prashant K. Rajput, Maharashtra (IN)

(73) Assignee: Husco International, Inc., Waukesha, WI (US)

( * ) Notice: Subject to any disclaimer, the term of this patent is extended or adjusted under 35 U.S.C. 154(b) by 530 days.

(21) Appl. No.: 13/259,354

(22) PCT Filed: Apr. 1, 2010

(86) PCT No.: PCT/US2010/029657

§ 371 (c)(1),
(2), (4) Date: Sep. 23, 2011

(87) PCT Pub. No.: WO2010/115019

PCT Pub. Date: Oct. 7, 2010

(65) Prior Publication Data

US 2012/0011997 A1    Jan. 19, 2012

Related U.S. Application Data

(60) Provisional application No. 61/166,104, filed on Apr. 2, 2009.

(51) Int. Cl.
F16D 31/02 (2006.01)
F16K 31/524 (2006.01)
F16K 11/10 (2006.01)
F04B 49/22 (2006.01)

(52) U.S. Cl.
CPC ......... F16K 31/52416 (2013.01); F16K 11/105 (2013.01); F04B 49/22 (2013.01)
USPC .................................. 60/468; 60/494; 60/486

(58) Field of Classification Search
USPC ............. 60/468, 493, 494, 486; 417/428, 429
See application file for complete search history.

(56) References Cited

U.S. PATENT DOCUMENTS 3,610,106 A   10/1971   Cavalieri
4,648,803 A   3/1987    Stephenson et al.
(Continued)

FOREIGN PATENT DOCUMENTS

GB   2430246 A   3/2007
WO   90/03519    4/1990
(Continued)

OTHER PUBLICATIONS

Payne, et al, Efficiency and dynamic performance of Digital Displacement(TM) hydraulic transmission in tidal current energy converters, J. Power and Energy, Proc. IMechE, vol. 221 Part A, pp. 207-218, 2007.

(Continued)

*Primary Examiner* — Edward Look
*Assistant Examiner* — Daniel Collins
(74) *Attorney, Agent, or Firm* — Quarles & Brady LLP; George E. Haas

(57) ABSTRACT

An apparatus includes a first plurality of cylinders, each coupled to a shared first port by a separate first valve and to a shared second port by a separate second valve. Each first and second valve has a chamber to which pressure from either the associated cylinder or the respective port is dynamically applied to select different operating modes. Each one of a second plurality of cylinders is coupled to the first port by a separate third valve and to a shared third port by a separate fourth valve. Each third and fourth valve has a chamber to which pressure from either the associated cylinder or the respective port is dynamically applied to select different operating modes. Selecting an operating mode enables the apparatus to act as a bidirectional pump or a hydraulic motor. Selectively controller the valves can deactivate an individual cylinder, while other cylinders remain active.

29 Claims, 9 Drawing Sheets

(56) References Cited

U.S. PATENT DOCUMENTS

| | | | |
|---|---|---|---|
| 4,913,628 A | | 4/1990 | Samland et al. |
| 4,915,595 A | | 4/1990 | Nelson et al. |
| 4,997,344 A | | 3/1991 | Nelson et al. |
| 5,032,065 A | * | 7/1991 | Yamamuro et al. ............ 417/428 |
| 5,054,371 A | | 10/1991 | Swinney |
| 5,136,932 A | | 8/1992 | Giamello |
| 5,190,446 A | | 3/1993 | Salter et al. |
| 5,213,482 A | | 5/1993 | Reinartz et al. |
| 5,249,935 A | | 10/1993 | Burgdorf |
| 5,259,738 A | | 11/1993 | Salter et al. |
| 5,329,767 A | | 7/1994 | Hewett |
| 5,509,383 A | * | 4/1996 | Kahrs et al. ................ 123/90.12 |
| 5,634,777 A | | 6/1997 | Albertin et al. |
| 5,639,066 A | | 6/1997 | Lambert et al. |
| 6,257,119 B1 | | 7/2001 | Ryken et al. |
| 6,681,571 B2 | * | 1/2004 | Bailey et al. .................... 60/489 |
| 6,745,992 B2 | | 6/2004 | Yang et al. |
| 6,986,498 B2 | | 1/2006 | Hirota et al. |
| 2006/0039795 A1 | | 2/2006 | Stein et al. |
| 2006/0201146 A1 | | 9/2006 | Tabor |
| 2007/0258832 A1 | | 11/2007 | Caldwell et al. |
| 2008/0072749 A1 | | 3/2008 | Pfaff et al. |

FOREIGN PATENT DOCUMENTS

| | | |
|---|---|---|
| WO | 91/05163 | 4/1991 |
| WO | 2005/095800 A1 | 10/2005 |
| WO | 2006/109079 A1 | 10/2006 |
| WO | 2007/088380 A1 | 8/2007 |
| WO | 2007/128977 A3 | 11/2007 |
| WO | 2008/009950 A1 | 1/2008 |
| WO | 2008/012558 A3 | 1/2008 |
| WO | 2008/012577 A2 | 1/2008 |
| WO | 2008/012586 A1 | 1/2008 |
| WO | 2008/012587 A2 | 1/2008 |
| WO | 2008/029073 A1 | 3/2008 |

OTHER PUBLICATIONS

Nieling, et al, Design of a Virtually Variable Displacement Pump/Motor, NCFP 105-10.1, University of Wisconsin-Madison, pp. 323-335, Mar. 2005.

Rampen, Gearless Transmissions for Large Wind Turbines—The History and Future of Hydraulic Drives, Artemis IP Ltd., Scotland.

Ivantysyn, et al., Hydrostatic Pumps and Motors: Principles, Design, Performance, Modelling, Analysis, Control and Testing, Tech Books International, New Delhi, India, 2003, pp. 286-287, 400-401, 404-405.

Dynex Hydraulics webpage; Dynex Checkball Piston Pumps; http://www.dynexhydraulics.com/split.htm; 2010.

Smith, et al., Using the John Deere Radial Piston Pump to Improve Productivity, The Engineering Resource for Advancing Mobility, SAE Technical Paper, 1985 International Off-Highway & Powerplant Congress and Exposition.

* cited by examiner

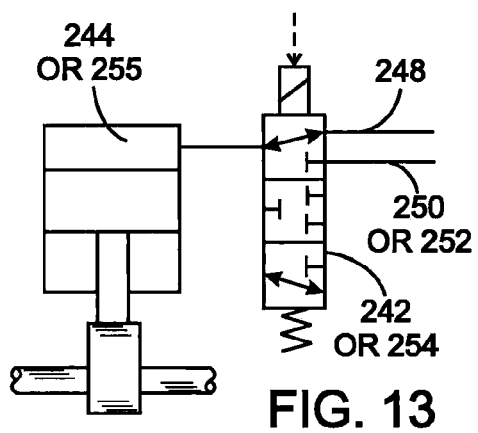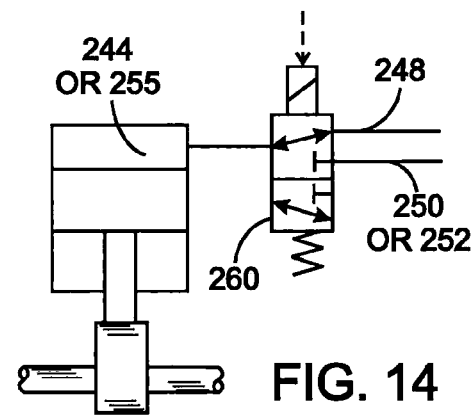
FIG. 13
FIG. 14

FLUID WORKING MACHINE WITH CYLINDERS COUPLED TO SPLIT EXTERIOR PORTS BY ELECTROHYDRAULIC VALVES

CROSS-REFERENCE TO RELATED APPLICATIONS

This application claims benefit of U.S. Provisional Patent Application No. 61/166,104 filed on Apr. 2, 2009.

STATEMENT REGARDING FEDERALLY SPONSORED RESEARCH OR DEVELOPMENT

Not Applicable

BACKGROUND OF THE INVENTION

1. Field of the Invention

The present invention relates to fluid working machines, such as pumps and hydraulic motors, which have pistons that slide in a cylinder, and more specifically to dynamically operated valves that selectively control flow of hydraulic fluid in and out of the cylinders.

2. Description of the Related Art

A common type of radial piston pump comprises a body with a plurality of cylinders radially disposed around a drive shaft for accommodating pistons. A piston is slideably received within each cylinder, thereby defining a chamber at the interior of the cylinder. The shaft has an eccentric cam and the pistons are biased by springs to ride against the cam. An inlet port supplies fluid to an inlet passage that is coupled through a separate inlet check valve to each cylinder chamber. A set of outlet check valves couples the cylinder chambers to an outlet passage that leads to an outlet port of the pump.

As the shaft is rotated by an exterior motor or engine, the eccentric cam causes the pistons to slide cyclically in and out of the cylinders, thereby reducing and expanding the volume of the respective cylinder chamber. During an intake phase of each piston cycle, when a given cylinder chamber volume is expanding, the inlet check valve opens allowing fluid to be drawn from the inlet passage into the cylinder chamber. During the subsequent exhaust phase of each piston cycle, when the volume of the cylinder chamber is reducing, fluid is expelled under pressure through the outlet check valve into the outlet port. The fluid intake and exhaust phases occur repeatedly during every rotation of the eccentric cam. At any point in time some of the radially disposed cylinders are in the intake phase and other cylinders are in the exhaust phase.

In another common pump design the cylinders and pistons are oriented parallel to the drive shaft. The reciprocating motion is created by a swash plate that lies in a plane that cuts across the center line of the drive shaft at an acute angle from perpendicular. One end of each piston rod is held in contact with the swash plate as the cylinder and piston assembly rotates with the drive shaft. This causes the pistons to reciprocate within the cylinders. The length of the piston stroke is proportional to the angle that the swash plate is set from perpendicular to the center line of the cylinders.

In the current state of art, hydrostatic (closed loop-swash plate and pintle) piston pumps and motors use fixed geometry aspiration porting, instead of the above mentioned simple check valve open loop pump, and metering with respect to piston motion. The fixed geometric porting has several deficiencies. One is that the timing is not perfectly matched to the various operating conditions. Another is an under-lap of intake to exhaust phases at a crossover point that results in instantaneous flow through the cylinder from high pressure to low pressure passages. This increases noise and vibration and reduces the volumetric efficiency. Friction losses of the components is another concern.

With certain hydraulic systems, there are times during which force from the load can drive the hydraulic actuator to send fluid under pressure backwards to the pump. For example, this action occurs in a hydraulic motor connected to the wheels of a vehicle that is braking. It is desirable to recover energy from the backwards flow. One approach is to use that flow to drive the pump as a motor and convert the fluid energy into mechanical energy applied to the drive shaft of the pump. That mechanical energy can augment or replace energy from the prime mover connected to the drive shaft. However, the outlet check valves block the reverse flowing fluid from entering a conventional pump.

SUMMARY OF THE INVENTION

The novel fluid working machine includes a housing with a first port, a second port, a third port, and a plurality of cylinders. The plurality of cylinders are divided into a first group and a second group. The cylinders in the first group are coupled between the first and second ports and the cylinders in the second group are coupled between the first and third ports. A separate piston is slideably received in each cylinder for reciprocating movement therein. A shaft operably coupled to move with the plurality of pistons.

A plurality of first valve arrangements is provided with each one associated with one cylinder in the first group. Each first valve arrangement has a first mode in which the first path is provided when pressure in the first exterior port is greater than pressure in the one cylinder and in which the second path is provided when pressure in the one cylinder is greater than pressure in the second exterior port. Each first valve arrangement also has a second mode in which the first path is provided when pressure in the one cylinder is greater than pressure in the first exterior port and in which the second path is provided when pressure in the second exterior port is greater than pressure in the one cylinder. Each first valve arrangement includes a mechanism for selecting between the first and second modes.

A plurality of second valve arrangements is provided with each one associated with a given cylinder in the second group. Each second valve arrangement has a third mode in which the third path is provided when pressure in the first exterior port is greater than pressure in the given cylinder and in which the fourth path is provided when pressure in the given cylinder is greater than pressure in the third exterior port. Each second valve arrangement also has a fourth mode in which the third path is provided when pressure in the given cylinder is greater than pressure in the first exterior port and in which the fourth path is provided when pressure in the third exterior port is greater than pressure in the given cylinder.

In one embodiment of the fluid working machine each of the first and second valve arrangements comprises a first check valve coupled between the first port and the respective cylinder. The first check valve has a first position that opens a first path for fluid to flow between the first port and the respective cylinder, and has a second position in which the first path is closed. Movement of the first check valve between the first and second positions is controlled by pressure in a separate first control chamber on one side of that first check valve. A first state valve is connected to the first control chamber, and has a first state in which a first passageway is provided between the first control chamber and the first port;

and has a second state in which a second passageway is provided between the first control chamber and the respective cylinder.

Each of the first and second valve arrangements also comprises a second check valve coupled between the respective cylinder and a given port of either the second or third ports. Each such second check valve has a third position that provides a second path for fluid to flow between the given port and the respective cylinder, and has a fourth position in which the second path is closed. Movement of the second check valve between the third and fourth positions is controlled by pressure in a separate second control chamber on one side of that second check valve. A second state valve is connected to the second control chamber, and has a third state in which a third passageway is provided between the second control chamber and the given port; and has a fourth state in which a fourth passageway is provided between the second control chamber and the respective cylinder.

BRIEF DESCRIPTION OF THE DRAWINGS

FIG. 13 is schematic diagram of the portion of the hydraulic circuit associated with one cylinder in the pump in FIG. 13; and FIG. 14 is schematic diagram of a branch of the hydraulic circuit associated with one cylinder in the pump wherein that branch has a two-position, three-way electrohydraulic spool valve.

DETAILED DESCRIPTION OF THE INVENTION

Figure 1:
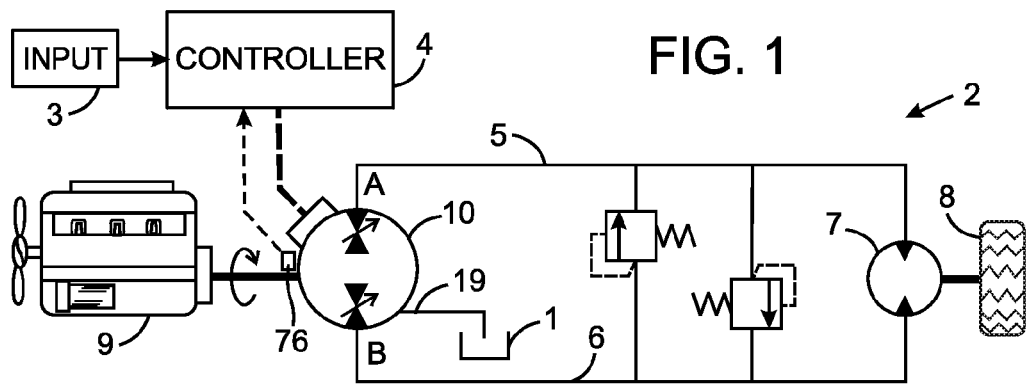
FIG. 1 is a schematic diagram of a closed loop hydraulic system that incorporates a radial piston fluid working machine according to the present invention.

With reference to FIG. 1, a closed loop hydraulic system 2 has a prime mover 9, such as an internal combustion engine or an electric motor, that is coupled by a shaft to drive a fluid working machine 10 to function as a pump. The fluid working machine 10 can be configured as a fixed displacement, bidirectional pump that is controlled to force fluid in either direction through lines 5 and 6 connected to a bidirectional hydraulic motor 7 that rotates a wheel 8 of a vehicle, for example. The fluid working machine 10 is dynamically configured, by the electrically operated state valves controlling reversible check valves, to draw fluid in from either line 5 or 6 and force the fluid under pressure into the other line, thereby driving the motor 7 in either direction. The operation of the fluid working machine 10, as will be described, is governed by a set of twelve solenoids that are operated by a controller 4 in response to direction and speed commands received from an operator input device 3, as will be described.

As used herein the term "reversible check valve assembly" refers to a device that controls the flow of fluid between to sections of a hydraulic system in response to the pressures in those two sections acting on the device. The device has two conditions, or states. In one condition, the device opens to permit fluid flow when the pressure in the first section, acting on a first surface of the device, is greater than pressure in the second section, which acts on a second surface of the device. In another condition, the device opens to permit fluid flow, when the pressure in the second section is greater than pressure in the first section. A mechanism is provided to selectively place the device in the first or second condition in response to a signal. For example, the device may have a valve body that has the first and second surfaces and opens and closes communication between the first and second sections of the hydraulic system. Pressure in a control chamber on one side of the valve body determines whether the device is in the first or second condition and that control chamber pressure is selectively controlled. For instance, a control valve may selectively apply pressure from either the first or the second section to the control chamber to select one of the two conditions.

There are times in which the wheel 8 drives the motor 7 to act as a pump forcing hydraulic fluid back to the fluid working machine 10. For example, as the vehicle is coasting to a stop, the fluid working machine 10 does not have to drive the motor 7 and the wheel 8. At this time, the kinetic energy of the vehicle can be used to drive the motor 7 as a pump and force fluid back to the fluid working machine 10. Now by configuring the fluid working machine 10 to function as a motor the fluid power produced by the motor 7 can be converted into mechanical energy that is applied to the shaft connected to the prime mover 9. The mechanical energy can augment the mechanical energy from the prime move to drive other components on the vehicle or the resultant energy can be stored for later use.

Therefore, the apparatus described herein is generically referred to as a "fluid working machine" since it is configured dynamically at different times to function as both a pump and a hydraulic motor at different times. It also should be appreciated that the present invention may be used with an apparatus that functions only as a pump or only as a hydraulic motor. Thus the term fluid working machine also refers to devices the operate as only a pump or a hydraulic motor.

Figure 2:
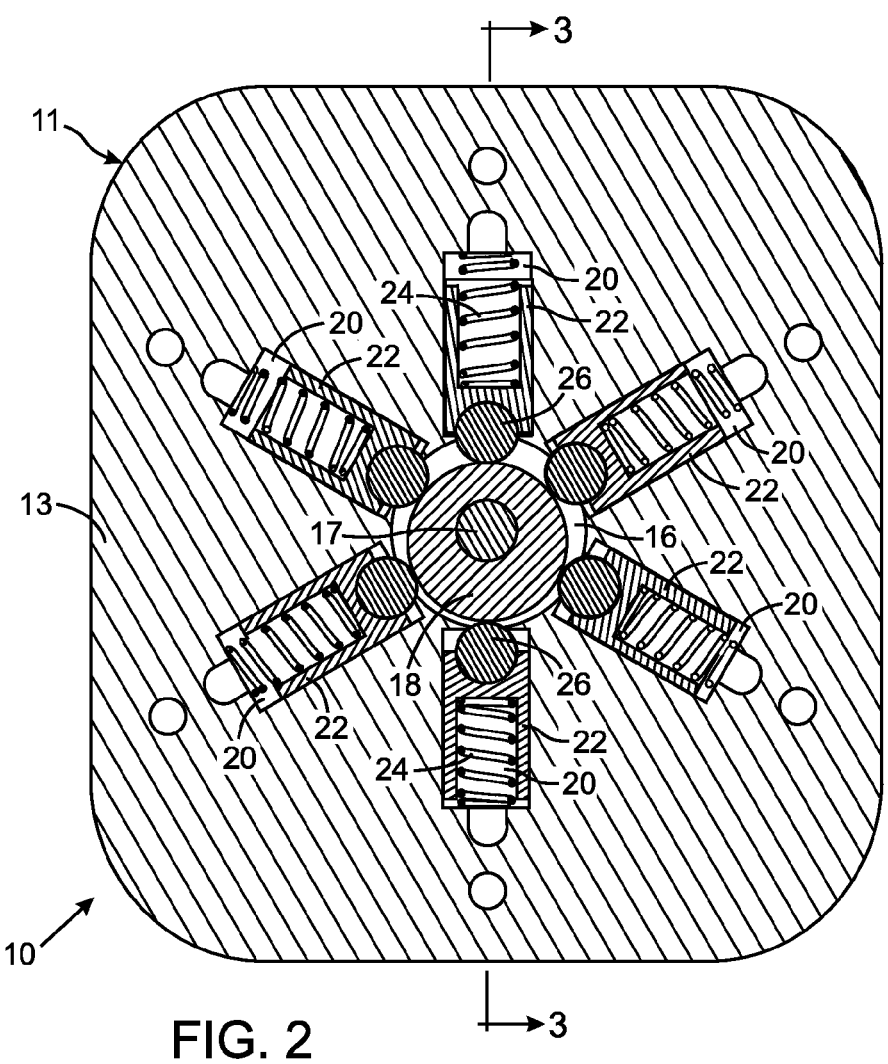
FIG. 2 is a radial cross section showing the arrangement of the cylinders and pistons of the fluid working machine.
Figure 3:
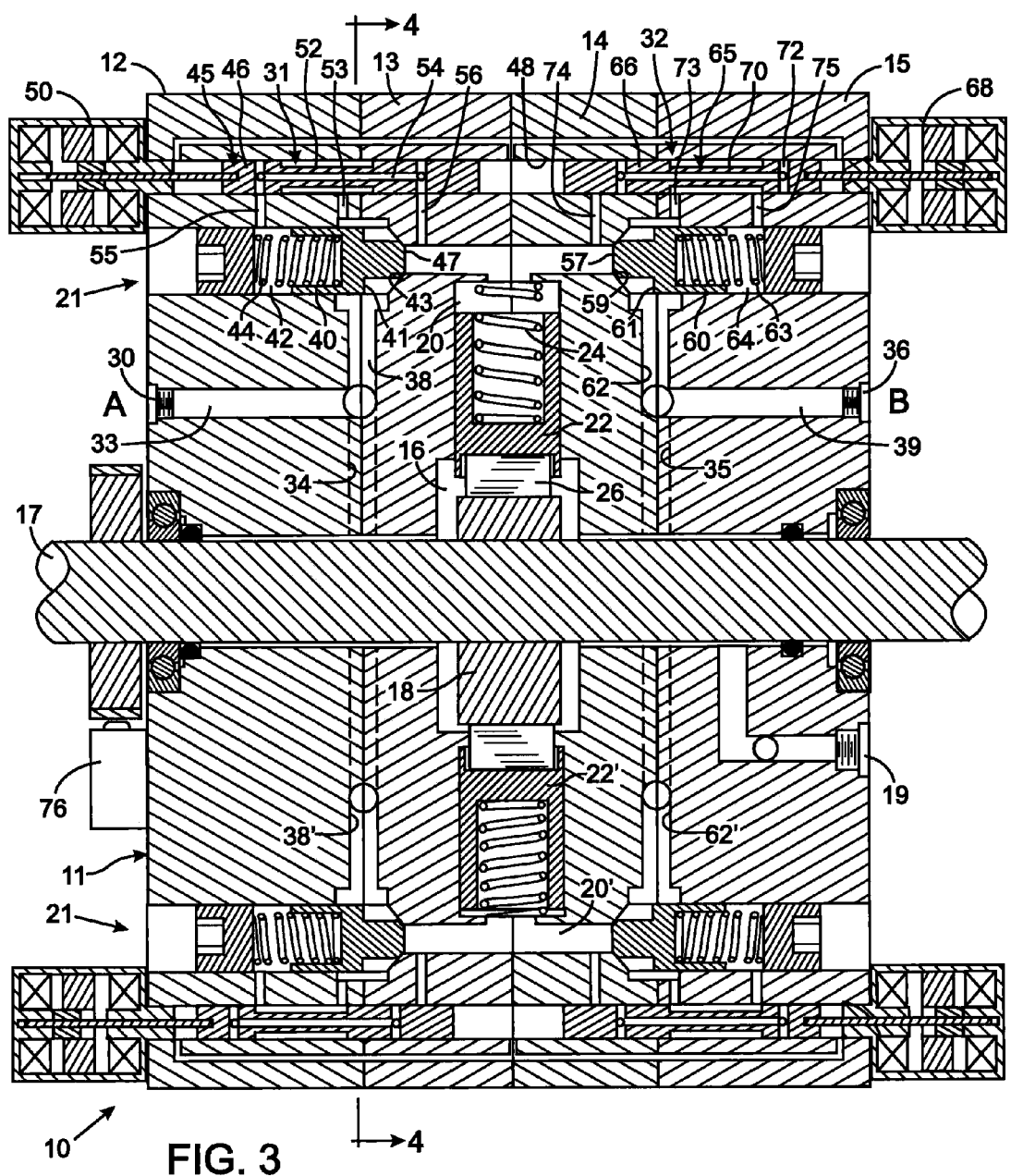
FIG. 3 is an axial cross section through the radial piston fluid working machine along line 3-3 in FIG. 2 and showing selectively reversible check valves in the fluid passages connected to the cylinders.

Referring to FIGS. 2 and 3, the fluid working machine 10 has a housing 11 formed by several abutting sections 12, 13, 14 and 15 with seals there between and secured together by bolts or other suitable fasteners. A cylindrical cavity 16 is formed between the middle housing sections 13 and 14 and is vented via a tank port 19 of the fluid working machine to the tank 1. A drive shaft 17 extends through the cylindrical cavity and has an eccentric cam 18 attached thereto. The prime mover 9 causes the drive shaft 17 and the eccentric cam 18 to rotate within the cylindrical cavity 16.

Six cylinder chambers 20 are radially located in the housing 11, spaced equidistantly around the cylindrical cavity, however more or less cylinder chambers may be provided. A separate piston 22 is slideably received within each cylinder chamber 20 and is biased inwardly toward the eccentric cam 18 by a separate spring 24. The inner end of each piston 22 has a roller-type follower 26 which the biasing of the piston by the spring causes to engage a surface of the eccentric cam 18. The follower 26 reduces friction losses as the eccentric cam rotates within the housing 11, thereby forcing the pistons 22 into and out of the cylinder chambers 20. As a piston 22 moves toward the shaft 17, fluid is drawn into the cylinder chamber 20, and thereafter when the eccentric cam 18 pushes the piston outward, the fluid is forced out of the cylinder chamber. Although the present invention is being described in the context of a radial piston pump, it should be understood that the concepts of the present invention can be applied to other pump and motor types, such as axial piston pumps and motors, fixed swash axial piston pump, an exterior eccentric pump or motor, and radial piston multi-stroke motors.

Figure 4:
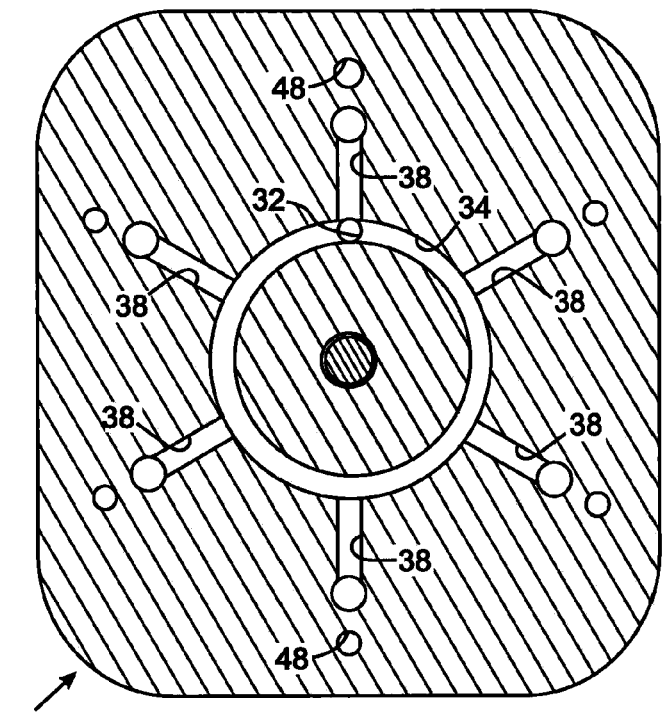
FIG. 4 is a cross section along line 4-4 in FIG. 3 showing internal interconnections of the fluid passages.

Associated with each cylinder chamber 20 is a separate valve arrangement 21 comprising several passages and first and second reversible check valve assemblies 31 and 32. Each first and second reversible check valve assembly 31 or 32 comprises a spring loaded check valve 40 or 60 and a solenoid operated state valve 46 or 65. The fluid flows into and out of each of the cylinder chambers through a series of passages in the valve arrangement 21 as shown in FIGS. 3 and 4. A first exterior port 30, located in an exterior surface of the first housing section 12, is connected by a first passage 33 to an annular passageway 34 that extends around the central axis and shaft 17 of the fluid working machine 10. A second exterior port 36, formed in an exterior surface of the fourth housing section 15, is connected by a second passage 39 to a second annular passageway 35 formed around the central axis and shaft 17, in similar manner to the first annular passageway 34. The first and second exterior ports 30 and 36 on the outside surface of the housing 11 enable the connection of external conduits and other devices to the fluid working machine 10.

The assembly of components for each of the six cylinder chambers 20 in the exemplary fluid working machine 10 has identical components that are coupled to the two annular passageways 34 and 35. The components for the cylinder chamber 20 and piston 22 in the upper half of FIG. 3 will be described in detail with that description applying to the other cylinder chambers. Fluid flows between the cylinder chamber 20 and the first and second annular passageways 34 and 35 through a pair of selectively reversible check valves 40 and 60. Specifically, the cylinder chamber 20 is associated with a first channel 38 extending to the first annular passageway 34. A selectively reversible first check valve 40 engages a first valve seat 43 in the first channel 38 in response to force from a first valve spring 44. The first check valve 40 is controlled by pressure in a first control chamber 42 on the remote side of the check valve from the first channel 38.

Pressure within the first control chamber 42 is governed by the position of a two-position, three-way first state valve 45 comprising a first state spool 46 that slides within a bore 48 that extends through the housing 11. The first state spool 46 has an exterior annular notch 52 and an internal passage 54 that in different positions of the spool in the bore selectively couple the first control chamber 42 to either the first channel 38 or to the cylinder chamber 20. The first state spool 46 is moved in response to electrical current of a signal applied by the controller 4 to a two-position, latching first solenoid 50. The first solenoid 50 has an armature connected to the first state spool 46 and alternately moves between two positions by an electromagnetic field produced by the electrical current. The armature is held in each position by a permanent magnet after electric current ceases to be applied to the solenoid. When the first state spool 46 is driven to the illustrated rightward state in the bore, the spool's internal passage 54 couples a first control chamber passage 55 to a first branch passage 56 that leads to the cylinder chamber 20. In the opposite leftward state of the first state spool 46, its exterior annular notch 52 provides a path between the first control chamber passage 55 and a passage 53 that opens into the first channel 38. Therefore, in the two states, or positions, of the first state spool 46, fluid pressure either from the first channel 38 or from the cylinder chamber 20 is alternately applied to the first control chamber 42. This dynamically configures the first check valve 40 to operate the fluid working machine 10 in several different modes, as will be described.

A selectively reversible second check valve 60 has a nose 57 that engages a second valve seat 59 located in a second channel 62, that extends between the second annular passageway 35 and the cylinder chamber 20. The direction at which fluid flows through the second check valve is determined by connection of a second control chamber 64 on the remote side of that check valve to pressure in either the second channel 62 or the cylinder chamber 20. That connection is governed by the position of a two-position, three-way second state valve 65 which comprises a second state spool 66 located within the bore 48. The second state spool 66 has an identical construction to that of the first state spool 46 and is operated by a second solenoid 68 that receives a current signal from the controller 4. The second solenoid 68 moves the second state spool 66 between two states, or positions, within the bore 48. In the illustrated state of the second spool 66, a second annular notch 70 on the exterior of the spool provides a path via passages 73 and 75 between the second control chamber 64 and the second channel 62. In the other state of the second state spool 66, an internal passage 72 in that spool provides a path, via passages 75 and 74, between the second control chamber 64 and the cylinder chamber 20. Thus, the two states, or positions, of the second state spool 66 alternately connect the second control chamber 64 to the second channel 62 or the cylinder chamber 20. This dynamically configures the second check valve 60 to operate the fluid working machine 10 in several different modes, as will be described.

Each of the other cylinder chambers 20 within the fluid working machine 10 are connected by a similar arrangement of passages, first and second check valves, and first and second state valves to the first and second annular passageways 34 and 35, such as for another cylinder chamber 20' in the bottom half of FIG. 3.

The first and second solenoids 50 and 68 for each of the cylinder chambers are operated by the controller 4 in response to signals from a sensor 76 that detects the position of the drive shaft 17. The sensor signals also enable the controller to measure the speed of the drive shaft.

Pumping Mode

With reference to FIGS. 1 and 3, depending upon the direction that the controller 4 desires to pump fluid through the fluid working machine 10 and send that fluid through the motor 7, the first and second solenoids 50 and 68 for each cylinder chamber are operated by the controller to position the first and second state spools 46 and 66. Assume, for example, that the fluid working machine 10 in the pump configuration is to draw fluid into the first exterior port 30 and send pressurized fluid out through the second exterior port 36.

Considering the uppermost cylinder chamber 20 in FIG. 3, the first solenoid 50 moves the first state spool 46 into the illustrated position thereby connecting the cylinder chamber 20, via the first branch passage 56, the internal spool passage 54, and the first control chamber passage 55, to the first control chamber 42 of the first check valve 40. The second state spool 66 is positioned so that its annular notch 70 provides a path between the control chamber passage 75 and the passage 73 leading to the second channel 62.

Rotation of the eccentric cam 18 causes each piston 22 to move cyclically out of the respective cylinder chamber 20 toward the drive shaft 17 during a fluid intake phase and then into the cylinder chamber during a fluid exhaust phase. A piston 22 is at a bottom dead center position when the volume of its cylinder chamber is the greatest, which occurs at a transition point in the piston cycle from the intake phase to the exhaust phase. A piston is at a top dead center position when the volume of its cylinder chamber is the smallest, which occurs at a transition point from the exhaust phase to the intake phase during each piston cycle. Because of the radial arrangement of the cylinder chambers 20, at any point in time some pistons are in the intake phase while other pistons are in the exhaust phase.

During the intake phase, the volume of the cylinder chamber 20 increases producing a negative pressure therein. That pressure is communicated through the first state spool 46 to the first control chamber 42 so that the negative pressure exists on both sides of the first check valve 40 shown in detail in FIG. 5. At this time, a positive pressure exists within the first channel 38 due to fluid returning from the output of the motor 7 and that positive pressure is applied to a shoulder 41 of the first check valve. Thus, the higher pressure in the first channel 38 than in the control chamber 42 forces the first check valve 40 away from the valve seat 43, thereby allowing fluid to flow from the first channel 38 into the expanding cylinder chamber 20.

When the first check valve 40 is opened, the second check valve 60 is held closed against its valve seat 59. Specifically, during the intake phase when a negative pressure occurs in the cylinder chamber 20, the pressure in the second channel 62 is positive due to the output of the other cylinder chambers present in the second annular passageway 35. Due to the illustrated position of the second state spool 66, that positive pressure is applied to the second control chamber 64, thereby holding the second check valve 60 closed against its valve seat 59. This operation of the upper piston 22 in FIGS. 2 and 3 continues until the eccentric cam 18 moves that piston to the illustrated bottom dead center position.

Thereafter, further rotation of the eccentric cam 18 moves the piston 22 into the exhaust phase during which the piston moves outward into the respective cylinder chamber 20 compressing the fluid therein. This increases the pressure in that cylinder chamber 20 which pressure also is applied via the first state spool 46 to the first control chamber 42 of the first check valve 40. Eventually that pressure is greater than the pressure in the first channel 38 at which point the additional force of the first valve spring 44 closes the first check valve 40. When the cylinder chamber pressure exceeds the pressure in the second channel 62 that is applied to the second control chamber 64 of the second check valve 60, the second check valve opens releasing the fluid from the cylinder chamber 20 into the second channel 62 and out the second exterior port 36.

When continued rotation of the eccentric cam 18 moves the piston 22 to the top dead center position, the exhaust phase is complete and thereafter the piston transitions into the intake phase of another cycle.

If it is desired to reverse the direction of fluid flow in the pump mode, i.e., draw fluid in from the second exterior port 36 and expel it under pressure from the first exterior port 30, the two selectively reversible check valves 40 and 60 change states from the states illustrated in FIG. 3. Specifically, the first state spool 46 conveys the pressure at the first exterior port 30, that now serves as the pump outlet, to the first control chamber 42 of the first check valve 40. The second state spool 66 conveys the cylinder chamber pressure to the second control chamber 64 of the second check valve 60. With those applied pressures, operation of the first and second check valves 40 and 60 is reversed from that described above with respect to flow from the first exterior port 30 to the second exterior port 36. As a result, the second check valve 60 now opens during the intake phase of each pumping cycle and the first check valve 40 opens during the exhaust phase thereby pumping fluid from the second exterior port 36 to the first exterior port 30. Selecting the state of the two state spools 46 and 66 enables bidirectional fluid flow through the radial cylinder type, fluid working machine 10.

In the pumping mode, operation of one or more cylinder chambers may be selectively deactivated during an entire pump cycle to vary the aggregate amount of fluid being pumped. One way to accomplish this is by reversing the position of whichever of the first or second check valve 40 or 60 is at the inlet port for the pump mode, through which fluid is drawn into the cylinder chamber during the intake phase. Assume that the inlet port is the first exterior port 30 and it is desired to deactivate the cylinder chamber 20 in the upper half of FIG. 3. In this case, the first solenoid 50 for that cylinder chamber is operated to place the associated first state spool 46 into the state that provides a path between the first channel 38 and the first control chamber 42 of the first check valve 40. Now during the intake phase, while the cylinder chamber volume is expanding, the negative pressure therein is applied only to the surface at the nose 47 of the first check valve 40, while the positive pressure in the first channel 38 is applied to the check valve shoulder 41 and to the opposing surface in the control chamber 42. That higher positive pressure acting on both sides of the first check valve 40 with the additional force provided by the first valve spring 44 maintains that check valve in the closed state during the intake phase. As a consequence, fluid is not drawn into that cylinder chamber 20 from the first channel 38.

With respect to the second check valve 60, the second state spool 66 provides a path between the second channel 62 and the control chamber 64. Thus, the second check valve 60 is similarly maintained closed during the intake phase. However, any fluid that might have been previously admitted to the cylinder chamber before being deactivated is expelled through either of the two check valves 40 and 60 during the exhaust phase.

Another way in which to deactivate selected cylinder chambers, to vary the amount of fluid being pumped, is to pump fluid back toward the port from which the fluid entered the cylinder chamber. Assume, for example, that in the pumping more the fluid working machine 10 is to draw fluid into the first exterior port 30 and send pressurized fluid out through the second exterior port 36. To deactivate a particular cylinder chamber, its associated first check valve 40 is initially configured for the intake phase, at about the top dead center position, by activating the first solenoid 50 to place the first state spool 46 into the position which provides a fluid path between the cylinder chamber 20 and the first control chamber 42. Now as the associated piston 22 moves toward the center drive shaft 17, the resultant negative pressure conveyed to the first control chamber 42 allows the positive pressure in the first channel 38 to force open the first check valve 40. This enables fluid to flow from the first exterior port 30 into the cylinder chamber 20. In the intake phase, the second check valve 60 is held closed by the second state spool 66 providing a path between the second control chamber 64 and the second channel 62 thereby conveying positive pressure into the second control chamber.

When the respective piston reaches the bottom dead center position, at the transition point between the intake and exhaust phases, the open and closed positions of the first and second check valves 40 are reversed. This is accomplished by the controller 4 activating the two solenoids 50 and 68 to change the positions of the first and second state spools 46 and 66. Now the first state spool 46 provides a path through which pressure in the first channel 38 is communicated to the first control chamber 42, and the second state spool 66 provides another path through which pressure in the cylinder chamber 20 is communicated to the second control chamber 64. During the exhaust phase, increasing pressure in the cylinder chamber forces the first check valve 40 open releasing the fluid back into the first channel 38 from which the fluid was drawn during the previous intake phase. The pressure in the cylinder chamber 20 applied to the second control chamber 64 adds to the force provided by second valve spring 63 and maintains the second check valve 60 closed against its seat.

Yet another way in which to vary the amount of fluid being pumped involves allowing fluid to enter each cylinder chamber during only a portion of the intake phase. Assume, for example, that the fluid working machine 10 in the pumping mode is to draw some fluid into the first exterior port 30 and send pressurized fluid out through the second exterior port 36. Considering the piston and cylinder in the upper half of FIG. 3 in this instance, the first check valve 40 is initially configured for the intake state. This is achieved by the first solenoid 50 placing the first state spool 46 into the illustrated position, which provides a fluid path between the cylinder chamber 20 and the first control chamber 42. Now as the associated piston 22 initially moves toward the center drive shaft 17, the positive pressure in the first channel 38 forces the first check valve 40 open drawing fluid from the first exterior port 30 into the cylinder chamber 20. In the intake phase, the second check valve 60 is held closed as described above.

At some point during the intake phase, the flow into the cylinder is terminated by reversing the state of the first check valve 40. For example, if one-half the full displacement in the pump mode is desired, the state reversal occurs half way through the intake phase, i.e., after the drive shaft 17 has rotated 90° from the top dead center position as detected by the drive shaft sensor 76. At that time, the controller 4 activates the first solenoid 50 to change the state position of the first state spool 46 to provide a fluid path between the first channel 38 and the first control chamber 42. This now applies positive pressure into the first control chamber 42 which forces the first check valve 40 closed against the negative pressure from the cylinder chamber 20. Thus the fluid flow into the cylinder chamber is terminated before completion of the intake phase of the piston cycle and in the example, after only half the maximum amount of fluid has entered that chamber. Cavitation is permitted to occur in the cylinder chamber 20 during the remainder of the intake phase.

When the piston 22 reaches the bottom dead center position, the controller 4 again activates the first solenoid 50 to return the first state spool 46 into the illustrated position, which provides a fluid path between the cylinder chamber 20 and the first control chamber 42. This configures both the first and second check valves 40 and 60 for the exhaust phase, which functions as described previously.

Alternatively, the pump configuration illustrated in FIGS. 2-5 can be adapted for an open loop hydraulic system with unidirectional flow by replacing, whichever selectively reversible check valve 40 or 60 is located in the outlet passage in the pump mode, with a conventional non-reversible check valve and eliminating the associated state valve 45 or 65, respectively. In this instance, the control chamber of that non-reversible check valve is permanently connected to the outlet port in the pump mode.

Thus by dynamically changing the states of the first and second state valves 45 and 65, operation of the first and second check valves 40 and 60 can be altered to place the fluid working machine into different operating modes. Those modes comprise the direction in which fluid is pumped and the number of cylinders that are active to pump the fluid. In addition the operation of the first and second state valves into different states can configure the fluid working machine to function as in a motoring mode.

Motoring Mode

There are times, such as when the vehicle is stopping or coasting, in which the kinetic energy of the wheels is used to drive the hydraulic motor 7 to pump fluid through lines 5 and 6. That fluid flow then operates the fluid working machine 10 as a motor to transfer the kinetic energy of the wheels to the drive shaft 17 connected to the prime mover 9. That kinetic energy can be used to aid in the rotation of that shaft and thereby used to power other components of the vehicle or the energy may be stored for subsequent use.

Figure 5:
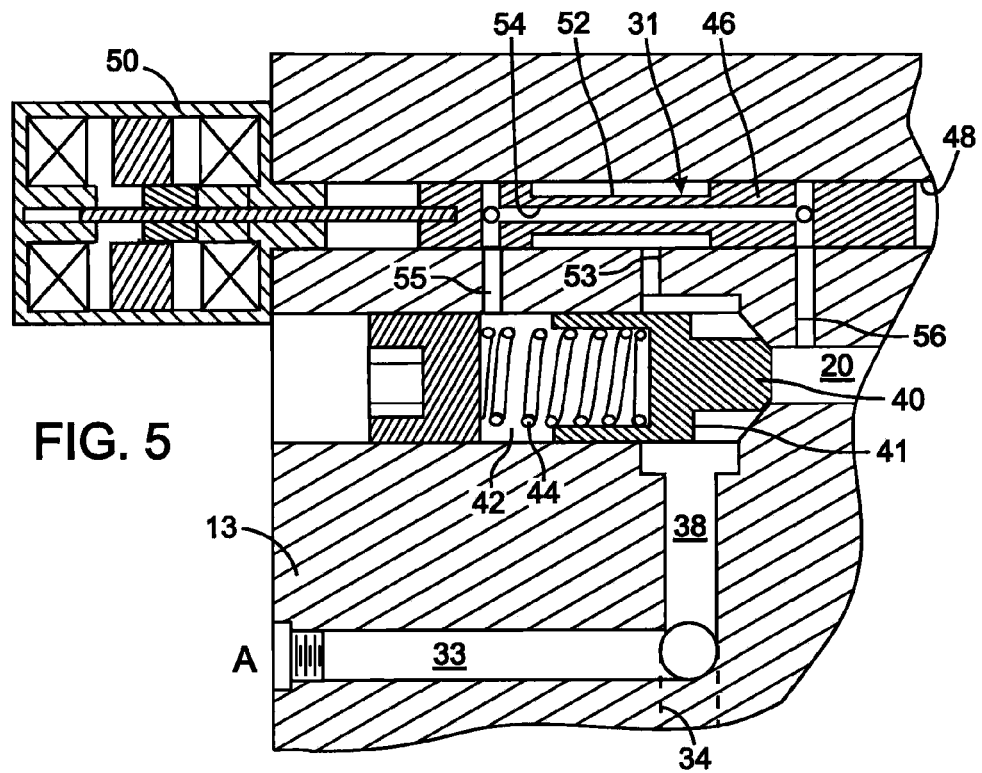
FIG. 5 is an enlarged section of FIG. 3 illustrating details of one of the selectively reversible check valves for a cylinder of the fluid working machine.

With continuing reference to FIGS. 3 and 5, the fluid working machine 10 in this situation is driven as a motor, thereby converting the hydraulic pressure into mechanical motion on the drive shaft 17. Assume, for example, that fluid from the motor 7 is being forced into the second exterior port 36, second passage 39 and second channel 62 of the fluid working machine 10. In the motoring mode of the fluid working machine, the controller 4 uses the drive shaft position signal from the sensor 76 to determine when each of the pistons 22 is pushed the farthest into the respective cylinder 20, i.e. the top dead center position. At that point, the piston travel enters the intake phase for which the controller 4 accordingly activates the solenoids 50 and 68, however solenoid operation point in the piston cycle may be retarded or advanced from the top dead center position. Now, the second check valve 60 is placed into a state in which the pressure in the cylinder chamber 20 is applied to the second control chamber 64. This is accomplished by the second solenoid 68 moving the second state spool 66 into a position at which the cylinder chamber passage 74 is connected by the spool's internal passage 72 to the passage 75 of the second control chamber 64. The first check valve 40 is placed into a similar state in which the pressure from the cylinder chamber 20 is applied to its control chamber 42. That likewise involves activating the first solenoid 50 so that the internal passage 54 of the first state spool 46 provides a path between the cylinder chamber 20 and the first control chamber 42.

As rotation of the eccentric cam 18 continues, the piston 22 moves from the top dead center position toward the shaft 17 of the fluid working machine, producing a negative in the respective cylinder chamber 20 and thus in the second control chamber 64 for the second check valve 60. Now the higher pressure, fed backwards into the second exterior port 36 and second channel 62 from the motor 7, is applied to the surface of shoulder 61 of the second check valve 60, thereby forcing that check valve open against the negative the cylinder chamber pressure. With the second check valve 60 open, the pressurized fluid entering the fluid working machine 10 in the motoring mode is sent into the cylinder chamber 20 and produces a force that drives the piston 22 against the eccentric cam 18. That force is transferred from the piston 22 onto the surface of the eccentric cam 18 adding to the rotation of the cam.

Eventually, the given piston 22 reaches the point in its cyclical travel closest to the shaft 17, i.e. the bottom dead center position. This position for the respective piston is detected by the controller 4 based on the drive shaft position signal from the sensor 76. At the bottom dead center position, the respective piston transitions from the intake phase to the exhaust phase in which the piston moves outward to compress the fluid in its cylinder chamber. This transition requires that the control chambers 42 and 64 of the two check valves 40 and 60 receive the pressures in the first and second channels 38 and 62, respectively. This is accomplished by the controller 4 activating the first and second solenoids 50 and 68 to change the states of the two state spools 46 and 66 into positions in which their annular notches 52 and 70 provide paths between the respective channel 38 or 62 and the associated control chamber 42 or 64. In other words, the first state spool 46 provides a path for pressure in the first channel 38 to be conveyed to the first check valve control chamber 42, and the annular recess around the second state spool 66 provides a path through which the pressure in the second channel 62 is applied to the second check valve control chamber 64. The transition point in the piston cycle at which the first and second solenoids 50 and 68 are operated may be retarded or advanced from the bottom dead center position.

Now the pressure in the second exterior port 36 and the second channel 62 is applied to both the surface of the shoulder 61 of the second check valve 60 and the opposing surface in the control chamber 64. This control chamber pressure and the additional force provided by second valve spring 63 maintains the second check valve 60 closed against its seat. In addition, the pressure in the first channel 38 is applied to both the surface of shoulder 41 of the first check valve 40 and the opposing surface within the first control chamber 42. Now, the higher pressure in the contracting cylinder chamber 20 is applied to the nose 47 of the first check valve 40 forcing that valve away from the valve seat into an open state. This releases the cylinder chamber pressure into the first channel 38 and out the first exterior port 30 of the fluid working machine 10. The exhaust phase continues until the piston again reaches the top dead center position from which the piston transition into another intake phase.

Thus, the fluid forced by the wheel motor 7 into the second exterior port 36 drives the fluid working machine 10 as a motor applying mechanical rotational force to the eccentric cam 18 and the drive shaft 17. As with the pumping mode, the state spools can be placed into positions in which some or all of the cylinders are disabled in the motoring mode. In addition, the positions of the state spools can switch at different times during the piston cycle to provide a partial stroke.

Figure 6:
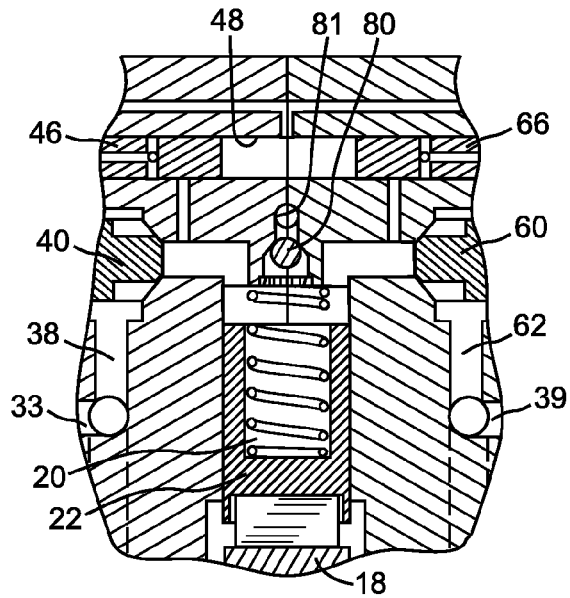
FIG. 6 is a cross section illustrating a modification of one of the cylinders to prevent cavitation.

With reference to FIG. 6, an anti-cavitation check valve 80 couples the cylinder chamber 20 to a tank passage 81 the leads to the tank port 19 in FIG. 3. The anti-cavitation check valve 80 enables fluid to flow only in a direction from the tank passage 81 into the cylinder chamber 20. Should cavitation occur in the cylinder chamber 20 the anti-cavitation check valve 80 opens to furnish fluid from the tank passage 81 into the cylinder.

Split Port Fluid Working Machine

Figure 7:
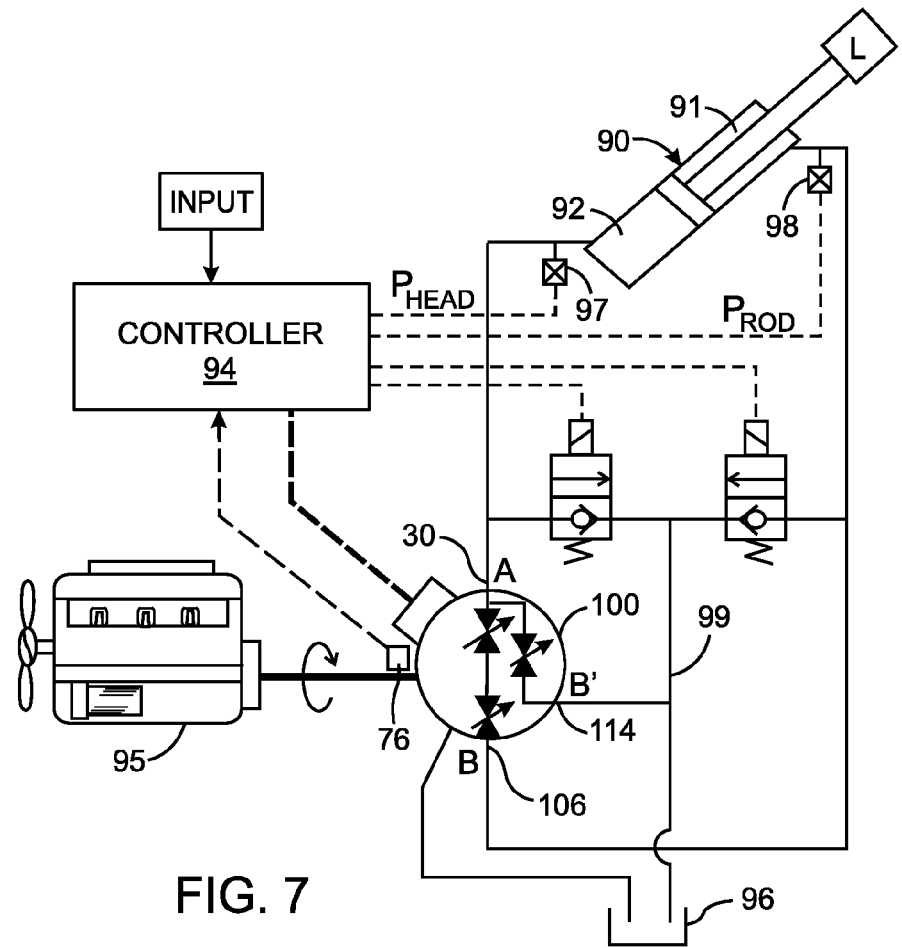
FIG. 7 is a schematic diagram of a hydraulic system that utilizes another embodiment of a fluid working machine to operate a hydraulic cylinder actuator.

FIG. 7 illustrates a split port pump/motor type fluid working machine 100 according to the present invention for use with a cylinder-piston hydraulic actuator 90 that has cavities 91 and 92 of unequal volumes. The rod cavity 91 has half the pressure area of the head cavity 92, thus more fluid is sent into and out of the head cavity than the rod cavity. The split port fluid working machine 100 is operated by a controller 94 in response to operator input commands and signals from two pressure sensors 97 and 98 in the hydraulic lines for the actuator cavities 91 and 92 and from a drive shaft sensor 76.

The cylinders of the split port fluid working machine 100 are equally divided into two groups. In the pump mode, half of the cylinders are in each group although other groupings may be used depending on the volume inequality of the two actuator cavities. All the pump cylinders are connected to a common first exterior port 30 (A) that is coupled to the head cavity 92. The pump cylinders in a first group are connected to a second exterior port (B) that is coupled to the rod cavity 91 and a second group of pump cylinders is connected to a third exterior port 114 (B') that is coupled to the tank line 99. The first, second and third exterior ports 30, 106 and 114 on the outside surface of the housing enable the connection of external conduits and other devices to the fluid working machine.

Figure 8:
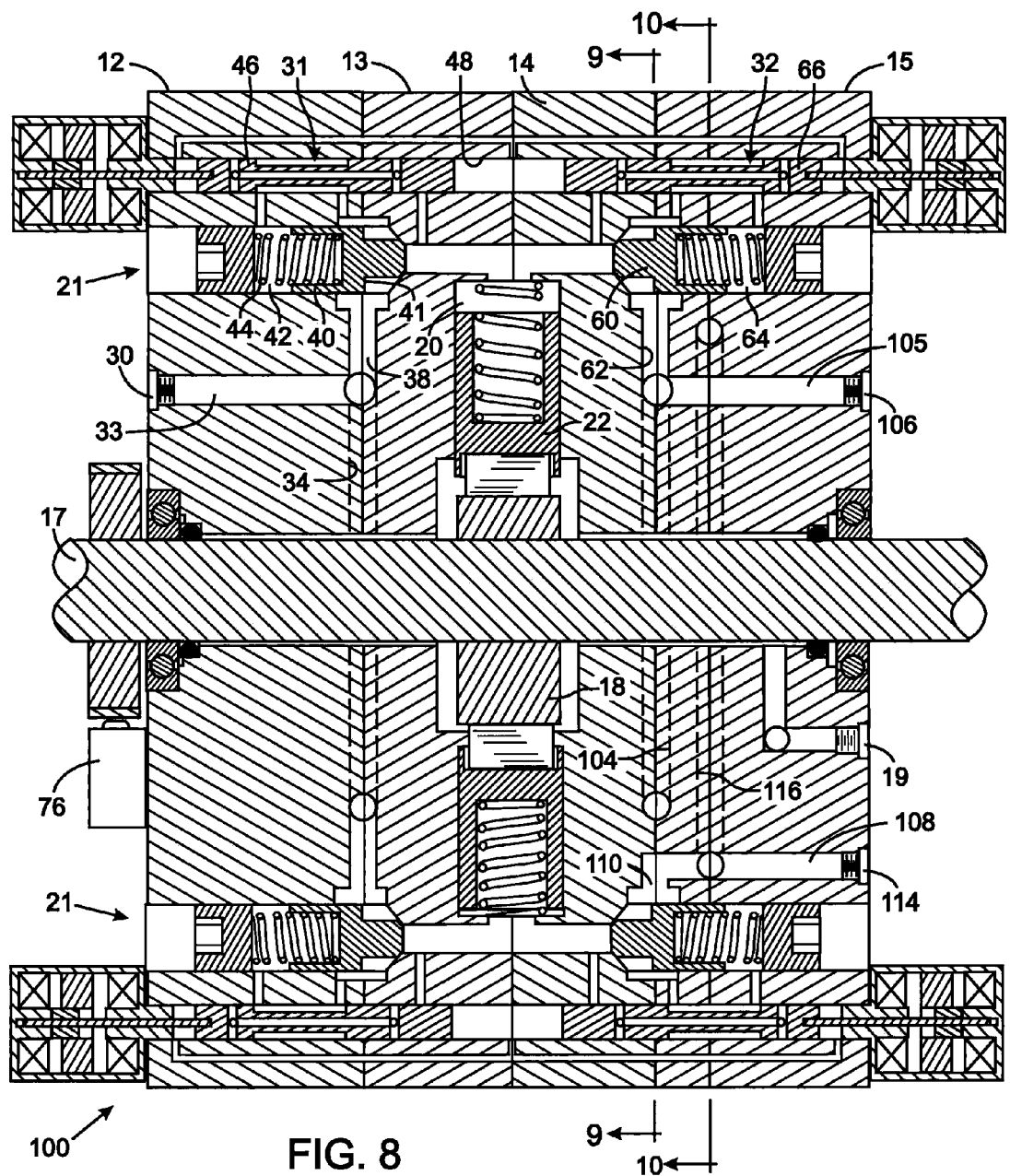
FIG. 8 is an axial cross section through the fluid working machine of FIG. 7 in which each cylinder is connected in one of two groups of cylinders.
Figure 9:
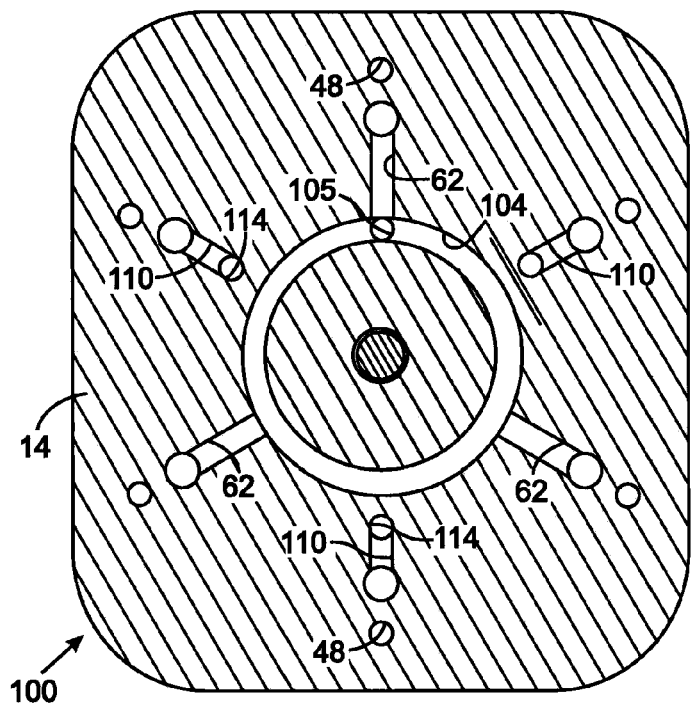
FIG. 9 is a radial cross section along line 9-9 in FIG. 8 showing interconnection of some of the internal fluid passages.
Figure 10:
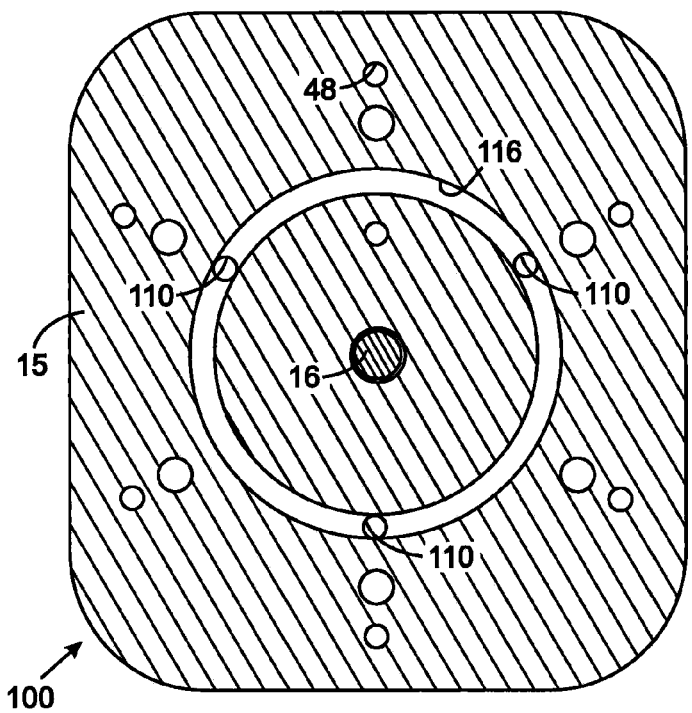
FIG. 10 is a radial cross section along line 10-10 in FIG. 8 showing interconnection of other internal fluid passages.

Referring to FIG. 8, the split port fluid working machine 100 has many components that are identical to those in the first fluid working machine 10 in FIG. 3 and those common components have been assigned identical reference numerals. The first exterior port 30 leads to a first annular passageway 34 that extends around the central axis and shaft 17 of the fluid working machine as shown in FIG. 4 and is connected to the first channels 38 associated with every cylinder chamber 20. In a similar manner, the second exterior port 106 communicates via passage 105 with a second annular passageway 104 that extends around the shaft 17 as shown in FIGS. 3 and 9 and is connected to the second channels 62 of three of the cylinder chambers 20. Those three cylinder chambers form a first group and each one is located between two cylinder chambers in the second group going in a circle around the drive shaft. That is, every other cylinder chamber is in the first group and the first group of cylinder chambers is interdigitated with the second group of cylinder chambers. The split port fluid working machine 100 has a third exterior port 114 that is connected by a passage 108 to a third annular passageway 116 that extends around the drive shaft 17 as shown in FIGS. 3 and 10. The third annular passageway 116 is in fluid communication with the third channels 110, that extend to the second check valve 60 for the three cylinder chambers 20 in the second group. Thus, every other pump cylinder chamber going around the drive shaft 17 is connected to the same annular passageway to form the same group of cylinder chambers.

With reference to FIGS. 7 and 8, when it is desired to retract the hydraulic actuator 90, fluid is pumped out of the head cavity 92 and into the rod cavity 91. Because of the size difference between those chambers, more fluid has to be pumped out of the head chamber than can be sent into the rod chamber. As a consequence, the split port fluid working machine 100 must be operated to send the excess fluid into the tank line 99. Because the head chamber is twice the size of the rod chamber, operating half the cylinder chambers to send fluid to the rod cavity 91 properly proportions the fluid. The remaining fluid exhausting from the head chamber is sent by the other group of three cylinders into the tank line 99.

Understand also that if the exterior force of the load being exerted on the hydraulic actuator 90 tends to retract that actuator, energy from the prime mover does not have to be used to drive the split port fluid working machine 100. Instead, the cylinders can be configured in the motoring mode. Varying how long after the top dead center position, the controller 94 commands the state spools to move between their intake and exhaust positions, alters when the two check valves make the intake to exhaust transition. This controls how much fluid flows through the cylinders during each piston cycle and thus how fast the hydraulic actuator 90 retracts.

Conversely, when it is desired to extend the hydraulic actuator 90, fluid is pumped out of the rod cavity 91 and forced into the head cavity 92. However, the size in equality between those two chambers requires that twice as much fluid be fed into the head chamber than is exhausted from the rod chamber. The additional fluid is provided by drawing fluid in from the tank line 99 through the second group of cylinder chambers and sending that fluid under pressure into the head chamber. In this mode of operation, the split port fluid working machine 100 is configured for pumping action being driven by the prime mover 95. Both groups of cylinders are configured in the pumping mode, described previously. Thus, while extending the hydraulic actuator 90, half of the fluid required for the head cavity 92 is pumped by each group of cylinder chambers.

A secondary, but advantageous, feature of the split port fluid working machine 100 is the ability to raise pressure in both exterior ports 30 and 106 simultaneously for dynamic control of high inertia loads on the actuator and velocity reversal transitions. This is achieved by varying the amount of fluid accumulating in the full hydraulic loop. Consider the example in which the hydraulic actuator 90 is extending and a controlled deceleration of the load L is anticipated. In this case, the first group of pistons that pump fluid from the rod cavity 91 via the second exterior port 106 into the actuator head cavity are operated at less than full displacement by selectively controlling the states of the associated check valves during each piston cycle. Now the fluid pumped from the tank 96 through third exterior port 114 and the second group of pistons into the head cavity 92 is increased proportionally, thereby feeding more fluid into the system and raising pressure in the rod cavity 91. The hydraulic load on the actuator 90 is monitored using the equation Load=$P_{HEAD}$−$P_{ROD}$/R, where $P_{HEAD}$ is the head cavity pressure, $P_{ROD}$ is the rod cavity pressure, and R is the ratio of piston surface area in the head cavity to the piston surface area in the rod cavity. In this situation the controller 94 is required to keep the pressure rise within a predefined range. Of particular note about this control paradigm is that the elevated rod cavity pressure, motors into the shaft and recovers this energy into the system making dynamic "clamping" or making any damping non-parasitic. This results in the pumping system having a transformer like characteristic.

Figure 11:
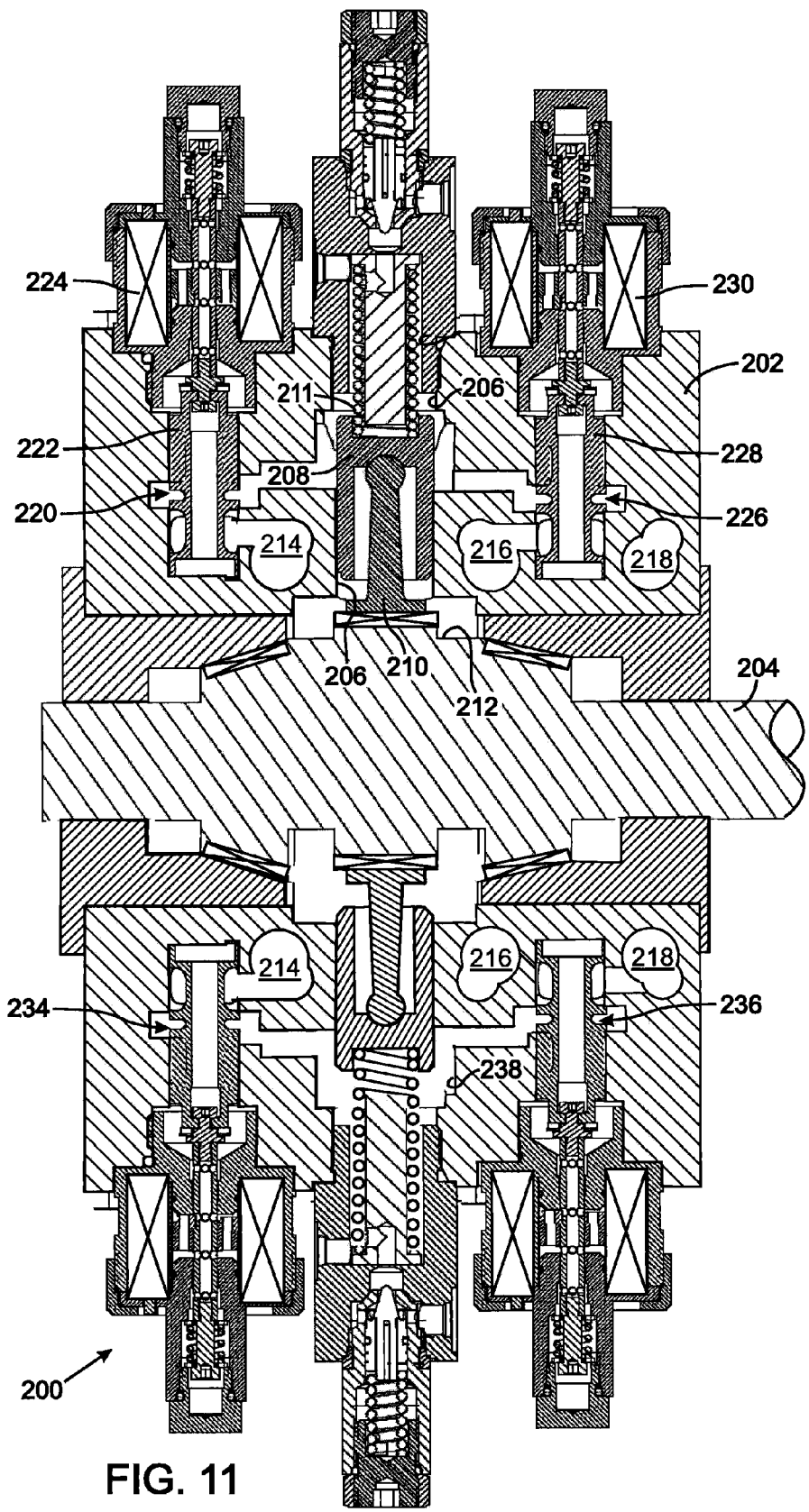
FIG. 11 is a partial radial cross section of an embodiment of a fluid working machine that has three exterior ports in which a pair of electrohydraulic two-way valves couple each cylinder to two of the three exterior ports.

Alternatively as shown in FIG. 11, another split port fluid working machine 200 utilizes a directly driven solenoid two-position, two-way valve in place of each reversible check valve assembly. Here the cylinder block 202 has a drive shaft 204 extending there through and from with a plurality of cylinders extend radially (only two cylinders 206 and 238 being illustrated). A piston 208 is slideably received in each cylinder and has a piston rod 210 that rides against a cam 212 of the drive shaft 204. A spring assembly 211 biases the piston and piston rod into engagement with the drive shaft cam.

The cylinder block 202 has a first exterior port connected to a first annular passageway 214 in a similar manner as the first exterior port 30 and an annular passageway 34 of the split port fluid working machine 100 in FIGS. 9-11. The cylinder block 202 also has a second exterior port connected to a second annular passageway 216 and a third exterior port connected to a third annular passageway 218 also as in the split port fluid working machine 100. The first, second and third exterior ports on the outside surface of the housing 202 enable the connection of external conduits and other devices to the fluid working machine 200.

As with the split port fluid working machine 100 in FIGS. 9-11, the cylinders in fluid working machine 200 are divided into first and second groups with the first group of cylinders coupled between the first and second exterior ports and the second group of cylinders coupled between the first and third exterior ports. Specifically, for each cylinder 206 in the first group, a separate electrohydraulic first two-way valve 220 has a first spool 222 that is moved between two positions by a first solenoid actuator 224. In a first position, the first two-way valve 220 provides a first path between the first annular passageway 214 and the associated cylinder 206 and in a second position the first path is closed. The first solenoid actuator 224 is operated by the controller 4 as shown in FIG. 1. An electrohydraulic second two-way valve 226 has a second spool 228 first two-way valve that is moved between two positions by a second solenoid actuator 230. In one position the second two-way valve 226 provides second path between the second annular passageway 216 and the associated cylinder 206 and in another position the second path is closed. The second solenoid actuator 230 also is operated by the controller 4.

Each given cylinder 238 in the second group of the split port fluid working machine 200 has a virtually identical arrangement of two electrohydraulic two-way spool valves, third and fourth two-way valves 234 and 236. The third two-way valve 234 controls a third path between the first annular passageway 214 and the given cylinder 238 and the fourth two-way valve 236 controls a fourth path between the given cylinder and the third annular passageway 218 that leads to the third exterior port.

When all the cylinders are active in the fluid working machine 200, the open and closed positions of the four two-way valves 220, 226, 234 and 236 are actively switched between the intake and exhaust phases of the pumping or motoring cycles. This switching replicates the operation of the selectively reversible check valves in the embodiment of FIG. 9 that has been described previously.

Figure 12:
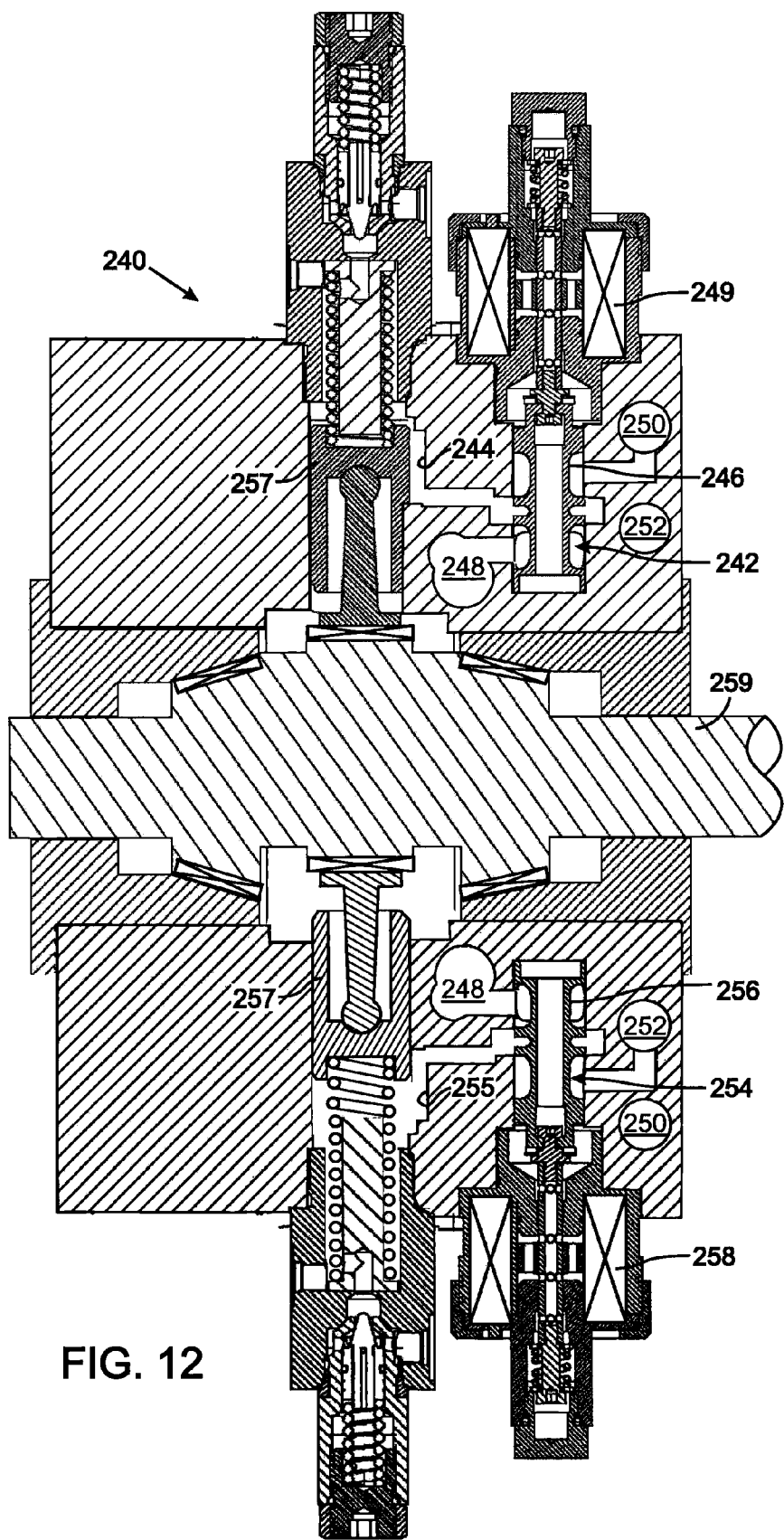
FIG. 12 is a partial radial cross section of another embodiment of a fluid working machine that has three exterior ports in which one electrohydraulic three-position, three-way valve couples each cylinder to two of the three exterior ports.

With reference to FIG. 12, another split port fluid working machine 240 has a plurality of cylinders 244 and 255 divided into two groups. The cylinders 244 in the first group convey fluid between a first annular passageway 248 connected to a first exterior port and a second annular passageway 250 connected to a second exterior port. The cylinders 255 in the second group convey fluid between the first annular passageway 248 and a third annular passageway 252 connected to a third exterior port. A piston 257 is slideably received in each cylinder and has a piston rod that rides against a cam of the drive shaft 259. A spring assembly biases the piston and piston rod into engagement with the drive shaft cam.

The fluid working machine 240 utilizes a single three-position, three-way electrohydraulic valve to control fluid flow to and from each cylinder 244 and 255. In the first cylinder group, a first electrohydraulic valve 242 has a first spool 246 that is driven into one of three positions by a first solenoid actuator 248. In a first position, the spool 246 provides a fluid path between the associated cylinder 244 and the first annular passageway 248 and in a second position, the first spool provides another fluid path between the associated cylinder and the second annular passageway 250. In a third position of the first spool 246, the associated cylinder 244 is closed off from communicating with both the first and second annular passageways.

For the second cylinder group, a second electrohydraulic valve 254 has a second spool 256 that is driven into one of three positions by a second solenoid actuator 258. In the first position, the second spool 256 provides a fluid path between the associated cylinder 255 and the first annular passageway 248 and in the second position the second spool 256 provides another fluid path between the associated cylinder and the third annular passageway 252. In the third position of the second spool 256, the associated cylinder 255 is closed off from communicating with both the first and third annular passageways 248 and 252. FIG. 13 schematically illustrates the connection of the single electrohydraulic three-position, three-way valve 242 or 254 to the associated cylinder and the respective two annular passageways.

When all the cylinders 244 and 255 are active in the fluid working machine 240, the open and closed positions of the three-position, three-way valves 242 and 254 are actively switched between the intake and exhaust phases of the pumping or motoring cycles.

FIG. 14 schematically illustrates the use of a single two-position, three-way electrohydraulic valve 260 with a cylinder 244 or 255 in an alternative version of the split port fluid working machine 240.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A fluid working machine for actuating a piston-cylinder hydraulic actuator, said fluid working machine comprising:
   a housing with a first exterior port, a second exterior port, a third exterior port, and a plurality of cylinders, the plurality of cylinders divided into a first group and a second group;
   a plurality of pistons, each slideably received in a different cylinder of the plurality of cylinders;
   a plurality of first valve arrangements, each associated with one cylinder in the first group and selectively providing a first path for fluid to flow between the first exterior port and the one cylinder and selectively providing a second path for fluid to flow between the second exterior port and the one cylinder, each first valve arrangement having:
      (1) a first mode in which the first path is provided when pressure in the first exterior port is greater than pressure in the one cylinder and in which the second path is provided when pressure in the one cylinder is greater than pressure in the second exterior port, and
      (2) having a second mode in which the first path is provided when pressure in the one cylinder is greater than pressure in the first exterior port and in which the second path is provided when pressure in the second exterior port is greater than pressure in the one cylinder, and
   a plurality of second valve arrangements, each associated with a given cylinder in the second group and selectively providing a third path for fluid to flow between the first exterior port and the given cylinder and selectively providing a fourth path for fluid to flow between the third exterior port and the given cylinder, each second valve arrangement having:
      (3) a third mode in which the third path is provided when pressure in the first exterior port is greater than pressure in the given cylinder and in which the fourth path is provided when pressure in the given cylinder is greater than pressure in the third exterior port, and
      (4) having a fourth mode in which the third path is provided when pressure in the given cylinder is greater than pressure in the first exterior port and in which the fourth path is provided when pressure in the third exterior port is greater than pressure in the given cylinder.

2. The fluid working machine as recited in claim 1 wherein each first valve arrangement comprises:
   a first reversible check valve assembly that in response to pressure acting thereon selectively provides the first path, and that in response to a first control signal has a first condition or a second condition, in the first condition the first reversible check valve assembly opens the first path when pressure from the first exterior port is greater than pressure in the one cylinder, and in the second condition the first reversible check valve assembly opens the first path when pressure in the one cylinder is greater than pressure in the first exterior port; and
   a second reversible check valve assembly that in response to pressure acting thereon selectively provides the second path, and that in response to a second control signal has a third condition or a fourth condition, in the third condition the second reversible check valve assembly opens the second path when pressure from the second exterior port is greater than pressure in the one cylinder, and in the fourth condition the second reversible check valve assembly opens the second path when pressure in the one cylinder is greater than pressure in the second exterior port.

3. The fluid working machine as recited in claim 1 wherein each first valve arrangement comprises:
   a first check valve selectively engaging a first valve seat, in response to pressure in a first control chamber, to control fluid flow between the first exterior port and the one cylinder, the first check valve including first and second surfaces and having a closed state in which the first surface is exposed to pressure in the one cylinder and the second surface is exposed to pressure in the first exterior port, wherein those pressures acting on the first and second surfaces tend to open the first check valve;
   a first state valve having a first state in which a first passage is provided between the first control chamber and the first exterior port, and having a second state in which a second passage is provided between the first control chamber and the one cylinder;
   a second check valve selectively engaging a second valve seat, in response to pressure in a second control chamber, to control fluid flow between the second exterior port and the one cylinder, the second check valve including third and fourth surfaces and having a closed state in which the third surface is exposed to pressure in the one cylinder and the fourth surface is exposed to pressure in the second exterior port, wherein those pressures acting on the third and fourth surfaces tend to open the second check valve;
   a second state valve having a third state in which a third passage is provided between the second control chamber and the second exterior port, and having a fourth state in which a fourth passage is provided between the second control chamber and the one cylinder; and
   a first actuator assembly for independently shifting the first state valve between the first and second states, and shifting the second state valve between the third and fourth states.

4. The fluid working machine as recited in claim 3 wherein each second valve arrangement comprises:
   a third check valve selectively engaging a third valve seat, in response to pressure in a third control chamber, to control fluid flow between the first exterior port and the given cylinder, the third check valve including fifth and sixth surfaces and having a closed state in which the fifth surface is exposed to pressure in the given cylinder and the sixth surface is exposed to pressure in the first exterior port, wherein those pressures acting on the fifth and sixth surfaces tend to open the third check valve;

a third state valve having a fifth state in which a passage is provided between the third control chamber and the first exterior port, and having a sixth state in which a passage is provided between the third control chamber and the given cylinder;

a fourth check valve selectively engaging a fourth valve seat, in response to pressure in a fourth control chamber, to control fluid flow between the third exterior port and the given cylinder, the fourth check valve including seventh and eighth surfaces and having a closed state in which the seventh surface is exposed to pressure in the given cylinder and the eighth surface is exposed to pressure in the third exterior port, wherein those pressures acting on the seventh and eighth surfaces tend to open the fourth check valve;

a fourth state valve having a seventh state in which a seventh passage is provided between the fourth control chamber and the third exterior port, and having an eighth state in which an eighth passage is provided between the fourth control chamber and the given cylinder; and a second actuator assembly for independently shifting the third state valve between the fifth and sixth states, and independently shifting the fourth state valve between the seventh and eighth states.

5. The fluid working machine as recited in claim 1 wherein each of the first and second valve arrangements comprises a two-way valve.

6. The fluid working machine as recited in claim 1 wherein each of the first and second valve arrangements comprises a three-position, three-way valve.

7. The fluid working machine as recited in claim 1 wherein each of the first and second valve arrangements comprises a two-position, three-way valve.

8. The fluid working machine as recited in claim 4 wherein the first actuator assembly comprises a first actuator for shifting the first state valve between the first state and the second state; and a second actuator for shifting the second state valve between the third state and the fourth state; and wherein the second actuator assembly comprises a third actuator for shifting the third state valve between the fifth state and the sixth state; and a fourth actuator for shifting the fourth state valve between the seventh state and the eighth state.

9. The fluid working machine as recited in claim 8 wherein the first actuator comprises a first solenoid that is activated by the first control signal; the second actuator comprises a second solenoid that is activated by the second control signal; the third actuator comprises another solenoid that is activated by a third control signal; and the fourth actuator comprises a fourth solenoid that is activated by a fourth control signal.

10. A fluid working machine for actuating a piston-cylinder hydraulic actuator, said fluid working machine comprising:

a housing with a first exterior port, a second exterior port, a third exterior port, and a plurality of cylinders divided into a first group and a second group;

a plurality of pistons, each slideably received in a different cylinder of the plurality of cylinders to move cyclically between an intake phase and an exhaust phase;

a first plurality of valve arrangements, each of which is associated with one cylinder in the first group, and in response to at least one control signal selectively opening and closing a first path for fluid to flow between the first exterior port and the one cylinder and selectively opening and closing a second path for fluid to flow between the second exterior port and the one cylinder; and a second plurality of valve arrangements, each of which is associated with a given cylinder in the second group, and in response to at least one other control signal selectively opening and closing a third path for fluid to flow between the first exterior port and the given cylinder and selectively opening and closing a fourth path for fluid to flow between the third exterior port and the given cylinder.

11. The fluid working machine as recited in claim 10 wherein each of the first plurality of valve arrangements comprises a first two-way valve controlling the first path and a second two-way valve controlling the second path.

12. The fluid working machine as recited in claim 10 wherein each of the second plurality of valve arrangements comprises a first two-way valve controlling the third path and a second two-way valve controlling the fourth path.

13. The fluid working machine as recited in claim 10 wherein each of the first and second plurality of valve arrangements comprises a two-position, three-way valve.

14. The fluid working machine as recited in claim 10 wherein each of the first and second plurality of valve arrangements comprises a three-position, three-way valve.

15. For a system having a piston-cylinder hydraulic actuator and a fluid working machine that includes a housing with first, second, and third exterior ports for making exterior connections to the housing, the housing further including a first plurality of cylinders for conveying fluid between the first and second exterior ports and a second plurality of cylinders for conveying fluid between the first and third exterior ports, and a separate piston is slideably received in each cylinder and connected to a drive shaft; a method for operating a fluid working machine comprising:

in response to at least one control signal, operating a separate first control valve arrangement associated with each one of the first plurality of cylinders to selectively open a first path between the respective one cylinder and the first exterior port, and to selectively open a second path between the respective one cylinder and the second exterior port; and in response to at least one control signal, operating a separate second control valve arrangement associated with each given one of the second plurality of cylinders to selectively open a third path between the respective given one cylinder and the first exterior port, and to selectively open a fourth path between the respective given one cylinder and the third exterior port.

16. The method as recited in claim 15 wherein operating the separate first control valve arrangement comprises operating a first control valve to selectively open and close the first path; and independently operating a second control valve to selectively open and close the second path.

17. The method as recited in claim 16 wherein operating the separate second control valve arrangement comprises operating a third control valve to selectively open and close the third path; and independently operating a fourth control valve to selectively open and close the fourth path.

18. The method as recited in claim 17 wherein operating each of the first, second, third and fourth control valves comprises operating a separate state valve that controls a reversible check valve.

19. The method as recited in claim 17 wherein operating each of the first, second, third and fourth control valves comprises operating a separate electrohydraulic two-way valve.

20. The method as recited in claim 15 wherein operating the separate first control valve arrangement and operating the separate second control valve arrangement each comprises electrically operating a three-way valve.

21. For a system having a piston-cylinder hydraulic actuator and a fluid working machine that includes a first plurality of cylinders each one connected to a separate first control valve assembly that responds to pressure in a first control chamber by selectively opening and closing a first fluid path between a first exterior port and the respective one cylinder and connected to a separate second control valve assembly that responds to pressure in a second control chamber by selectively opening and closing a second fluid path between a second exterior port and the respective one cylinder, the fluid working machine further includes a second plurality of cylinders each given one connected to a separate third control valve assembly that responds to pressure in a third control chamber by selectively opening and closing a third fluid path between a first exterior port and the respective given one cylinder and connected to a separate fourth control valve assembly that responds to pressure in a fourth control chamber by selectively opening and closing a fourth fluid path between a third exterior port and the respective given one cylinder, and a separate pistons slideably received in each of the first and second the plurality of cylinders; a method for operating the fluid working machine comprising:

alternately connecting the first control chamber to the first port and to the one cylinder;

alternately connecting the second control chamber to the second port and to the one cylinder;

alternately connecting the third control chamber to the first port and to the given one cylinder; and alternately connecting the fourth control chamber to the third port and to the given one cylinder.

22. The method as recited in claim 21 comprising operating in a first mode in which a passage is opened between the first control chamber and the one cylinder, another passage is opened between the second control chamber and the second exterior port, a different passage is opened between the third control chamber and the given one cylinder, a further passage is opened between the fourth control chamber and the third exterior port.

23. The method as recited in claim 22 further comprising, while in the first mode, closing the passage between the first control chamber and the one cylinder and at least momentarily conveying pressure from the first exterior port into the first control chamber.

24. The method as recited in claim 21 comprising operating in a first mode in which a passage is opened between the first control chamber and the first exterior port, another passage is opened between the second control chamber and the one cylinder, a different passage is opened between the third control chamber and the third exterior port, a further passage is opened between the fourth control chamber and the given one cylinder.

25. The fluid working machine as recited in claim 2 further comprising:

a third reversible check valve assembly that in response to pressure acting thereon selectively provides the third path, and that has a fifth condition and a sixth condition, in the fifth condition the third reversible check valve assembly opens the third path when pressure from the first exterior port is greater than pressure in the given cylinder, and in the sixth condition the third reversible check valve assembly opens the third path when pressure in the given cylinder is greater than pressure in the first exterior port, and a fourth reversible check valve assembly that in response to pressure acting thereon selectively provides the fourth path, and that has a seventh condition and an eighth condition, in the seventh condition the fourth reversible check valve assembly opens the fourth path when pressure from the third exterior port is greater than pressure in the given cylinder, and in the eighth condition the fourth reversible check valve assembly opens the fourth path when pressure in the given cylinder is greater than pressure in the third exterior port.

26. The method as recited in claim 15 wherein the first fluid path is open for less than an entire intake phase for the given cylinder, thereby controlling a displacement of the fluid working machine.

27. The method as recited in claim 15 wherein the third fluid path is open for less than an entire duration of an intake phase for the particular cylinder, thereby controlling a displacement of the fluid working machine.

28. The method as recited in claim 15 further comprising during the intake phase for at least some of the particular cylinders, maintaining the third path closed.

29. The method as recited in claim 15 wherein operating a separate first control valve arrangement and operating a separate second control valve arrangement, both comprise operating a separate electrohydraulic state valve that controls operation of a check valve that opens and closes the respective path.

* * * * *